United States Patent
Hirayama et al.

[11] Patent Number: 6,147,023
[45] Date of Patent: Nov. 14, 2000

[54] HYDROCARBON-ADSORBENT

[75] Inventors: Hiroshi Hirayama, Okazaki; Takaaki Kanazawa, Toyota; Kazuhiro Sakurai, Gotenba, all of Japan

[73] Assignee: Toyota Jidosha Kabushiki Kaisha, Toyota, Japan

[21] Appl. No.: 09/177,128

[22] Filed: Oct. 22, 1998

[30] Foreign Application Priority Data

Oct. 28, 1997 [JP] Japan .................................. 9-295214
Aug. 21, 1998 [JP] Japan ................................ 10-235913

[51] Int. Cl.$^7$ .................................................. B01J 29/06
[52] U.S. Cl. ................................ 502/64; 502/66; 502/67; 502/71; 502/77; 502/78; 502/79
[58] Field of Search ................................ 502/64, 66, 67, 502/71, 77, 78, 79

[56] References Cited

U.S. PATENT DOCUMENTS

| | | | |
|---|---|---|---|
| 3,894,940 | 7/1975 | Scherzer et al. | 208/120 |
| 4,797,266 | 1/1989 | Evans . | |
| 5,077,253 | 12/1991 | Chu et al. | 502/61 |
| 5,278,114 | 1/1994 | Wielers et al. | 502/67 |
| 5,292,696 | 3/1994 | Ito et al. | 502/66 |
| 5,407,880 | 4/1995 | Ikeda et al. . | |
| 5,662,869 | 9/1997 | Abe et al. . | |
| 5,744,103 | 4/1998 | Yamada et al. | 422/171 |
| 5,880,053 | 3/1999 | Roland et al. | 502/79 |
| 5,928,981 | 7/1999 | Leyrer et al. | 502/64 |

FOREIGN PATENT DOCUMENTS

| | | |
|---|---|---|
| 0 106 552 A1 | 4/1984 | European Pat. Off. . |
| 0 583 594 A1 | 2/1994 | European Pat. Off. . |
| 0 599 117 A1 | 6/1994 | European Pat. Off. . |
| 42 39 875 A1 | 6/1994 | Germany . |
| 44 35 073 A1 | 4/1995 | Germany . |
| 3-232533 | 10/1991 | Japan . |
| 5-59941 | 3/1993 | Japan . |
| 5-317701 | 12/1993 | Japan . |
| 6-154538 | 6/1994 | Japan . |
| 6-198164 | 7/1994 | Japan . |
| 6-312132 | 11/1994 | Japan . |
| 7-96178 | 4/1995 | Japan . |
| 7-144128 | 6/1995 | Japan . |
| 7-155613 | 6/1995 | Japan . |

OTHER PUBLICATIONS

Database WPI, Section Ch, Week 9504, Derwent Publications Ltd., London, GB; Class E19, AN 95–027348 XP002115572 & JP 06 312132 A (Mitsubishi Jukogyo KK), Nov. 8, 1994 (Nov. 8, 1994)—(Abstract Only).

*Primary Examiner*—Tom Dunn
*Attorney, Agent, or Firm*—Oliff & Berridge, PLC

[57] ABSTRACT

An HC-adsorbent capable of adsorbing various kinds of hydrocarbon including lower and higher hydrocarbon, of which the adsorbable amount per unit volume is large, and which exhibits excellent durability at elevated temperatures. The HC-adsorbent is composed of a first zeolite of ZSM-5 of which the silica/alumina ($SiO_2/Al_2O_3$) mole-ratio is 500 or more, and a second zeolite of Y-type zeolite of which the silica/alumina ($SiO_2/Al_2O_3$) mole-ratio is 200 or more. The second zeolite mainly adsorbs higher hydrocarbon while the first zeolite mainly adsorbs lower hydrocarbon, thus enabling adsorption of many kinds of hydrocarbon.

17 Claims, 1 Drawing Sheet

HYDROCARBON-ADSORBENT

BACKGROUND OF THE INVENTION

1. Field of the Invention

The present invention relates to hydrocarbon-adsorbents capable of effectively adsorbing hydrocarbon (HC) in exhaust gases emitted from gasoline engines or the like.

2. Description of Related Art

Zeolite having another name of molecular sieves has pores of which the dimensions are nearly equal to those of molecules, and consequently has been used as adsorbents and catalysts in many reactions. Zeolite contains cations adapted to neutralize negative charges of aluminum oxide, which are readily exchanged with another cations in aqueous solutions thereof, so as to be used as cation-exchangers, too.

Recently, application of zeolite having the above-described properties to catalysts for purifying exhaust gases of automobiles has been investigated. In Japanese Patent application-laid open No. Heisei 3-232533, for example, a catalyst for purification of exhaust gases, which is composed of zeolite carrying noble metals such as platinum or palladium, is disclosed.

Zeolite itself is, however, low in carrying properties of such noble metals, and consequently, the amount of carried noble metals is too small to exhibit sufficient oxiding ability. Since the catalyst is not activated at 300° C. or less, in case the exhaust gas temperature is low, such as at an engine starting time, HC in exhaust gases cannot be sufficiently purified. When the engine is in the cold state where an air-fuel mixture having a higher fuel concentration than that under normal engine operation, is supplied, the amount of hydrocarbon contained in exhaust gases is great. Consequently, it is desired to purify hydrocarbon effectively particularly when the engine is started or in the cold state.

To this effect, recently, zeolite has been used as an HC-adsorbent. In Japanese Patent application-laid open No. Heisei 5-317701, for example, there is a disclosure that zeolite as an HC-adsorbent, which has a predetermined range of $SiO_2/Al_2O_3$ mole-ratio, is used along with an oxidation catalyst, thereby improving the purifying performance of HC when the engine is started in the cold state.

By using the oxidation catalyst and adsorbent together in the low temperature range, HC is adsorbed by the adsorbent temporarily to restrain the emission thereof. When the temperature of the adsorbent rises to a predetermined temperature or more, the adsorbed HC is emitted, and oxidized and purified with the oxidation catalyst existing near the adsorbent. Thus, HC can be purified stably from the lower temperature range to the higher temperature range.

In addition, in Japanese Patent application-laid open No. Heisei 6-154538, there is a disclosure about the method of disposing zeolite downstream of a three-way catalyst in an exhaust gas flow to adsorb HC in exhaust gases in the low temperature range, and emitting adsorbed HC in the elevated temperature range, thereby purifying exhaust gases. With this method, HC which has been emitted when the engine is started in the cold state can be purified effectively with the three-way catalyst.

And, in Japanese Patent application-laid open No. Heisei 7-96178, there is a disclosure that zeolite composed of at least one of ZSM-5, mordenite, Y-type zeolite and X-type zeolite is used as the HC-adsorbent, and that the preferred $SiO_2/Al_2O_3$ mole-ratio of zeolite ranges from 15 to 250.

The HC-adsorbent using zeolite has, however, the problem that the adsorption efficiency greatly depends on the kinds of HC. More specifically, higher HC of which the number of carbon is 4 or more is adsorbed at a relatively higher rate. In contrast, lower HC of which the number of carbon is 3 or less is difficult to be adsorbed. The HC-adsorbent adapted to be secured to an exhaust system of an engine is also required to exhibit durability at elevated temperatures up to about 800° C.

SUMMARY OF THE INVENTION

It is an object of the present invention to provide an HC-adsorbent capable of adsorbing various kinds of HC with a large amount of adsorption per unit volume, and exhibiting excellent durability at elevated temperatures.

With a first aspect of the present invention, the HC-adsorbent is composed of a first zeolite including ZSM-5 of which the $SiO_2/Al_2O_3$ mole-ratio is 500 or more, and a second zeolite including Y-type zeolite of which the $SiO_2/Al_2O_3$ /mole-ratio is 200 or more.

With a second aspect of the present invention, the HC-adsorbent is composed of a first zeolite including ZSM-5 of which the $SiO_2/Al_2O_3$ mole-ratio is 500 or more, and a second zeolite including mordenite of which the $SiO_2/Al_2O_3$ mole-ratio is 100 or more.

With a third aspect of the present invention, the HC-adsorbent is composed of a first zeolite including mordenite of which the $SiO_2/Al_2O_3$ mole-ratio is 100 or more, and a second zeolite including Y-type zeolite of which the $SiO_2/Al_2O_3$ mole-ratio is 200 or more.

With a fourth aspect of the present invention, the HC-adsorbent of the first, second or third aspect has the weight ratio of the first zeolite to second zeolite ranging from 50/50 to 85/15.

With a fifth aspect of the present invention, the HC-adsorbent of the first, second or third aspect further has at least one of Ag and Pd, which is carried by at least one of the first zeolite and second zeolite.

With a sixth aspect of the present invention, the HC-adsorbent is composed of a first zeolite including ferrierite, and a second zeolite including at least one of ZSM-5 of which the $SiO_2/Al_2O_3$ mole-ratio is 500 or more, Y-type zeolite of which the $SiO_2/Al_2O_3$ mole-ratio is 200 or more, and mordenite of which the $SiO_2/Al_2O_3$ mole-ratio is 100 or more.

With a seventh aspect of the present invention, the HC-adsorbent of the sixth aspect further has at least one of Ag and Pd, which is carried by ferrierite.

Zeolite is a salt of aluminosilicate, chemically, and various types of zeolite having various $SiO_2/Al_2O_3$ mole-ratios have been known. It has become clear that the catalyst properties of zeolite greatly change with the $SiO_2/Al_2O_3$ mole-ratio.

Zeolite of which the $SiO_2/Al_2O_3$ mole-ratio is small has a large number of acid centers, high cracking ability, and high HC-adsorbing ability. However, zeolite having a large number of acid centers has the defect that HC adsorbed in the pores is carbonized to generate caulking readily and close the pores, thereby decreasing the HC-adsorbing ability with time.

And zeolite having a large number of acid centers has another defect that upon performing a hydrothermal endurance test, separation of aluminium occurs (coordination number in zeolite structure changes from 4 to 6) so that the acid centers disappear readily, thereby decreasing the cracking ability. In constrast, zeolite of which the $SiO_2/Al_2O_3$ mole-ratio is large has a small number of acid centers so that the cracking ability is low, but has the advantage that the HC-adsorption ability does not decrease with time, because no caulking of pores occurs.

With the first through fifth aspects of the present invention, mordenite of which the $SiO_2/Al_2O_3$ mole-ratio is 100 or more, Y-type zeolite of which the $SiO_2/Al_2O_3$ mole-ratio is 200 or more, or ZSM-5 of which the $SiO_2/Al_2O_3$ mole-ratiois 500 or more is used as each of the first zeolite and second zeolite.

In addition, it has become clear that there is a correlation between the pore diameter of zeolite and the number of carbon (molecular volume) of HC adsorbed in the pores. For example, the molecular diameter of ethane ($C_2H_6$) of which the number of carbon is 2 about 4 Å, that of propane ($C_3H_8$) is about 4.89 Å and that of toluene ($C_7H_8$) is about 6.89 Å. In contrast, the pore diameter of ZSM-5 is 5.5 Å, that of mordenite is 7 Å, and that of Y-type zeolite is 8 Å.

More specifically, toluene can be adsorbed in the pores of mordenite and Y-type zeolite, but cannot be adsorbed in the pores of ZSM-5. Propane and ethane can be adsorbed in the pores of all kinds of zeolite, but since the pore diameter of Y-type zeolite is too large, as compared to the molecular diameter of propane and ethane, there is a possibility of adsorbed molecules escaping through the pores.

Consequently, in the pores having smaller diameters, HC of which the number of carbon is smaller and molecular volume is smaller is adsorbed mainly while in the pores having larger diameters, HC of which the number of carbon is larger and molecular volume is larger is adsorbed mainly. Namely, HC of which the number of carbon is smaller and molecular volume is smaller tends to be adsorbed on ZSM-5 while HC of which the number of carbon is larger and molecular volume is larger tends to be adsorbed on Y-type zeolite. And mordenite tends to adsorb HC of which the molecular volume is in the medium range.

Accordingly, HC-adsorbent of the first aspect of the present invention is composed of a first zeolite of ZSM-5, and a second zeolite of Y-type zeolite. Consequently, HC of which the number of carbon is smaller and molecular volume is smaller is adsorbed mainly on ZSM-5 while HC of which the number of carbon is larger and molecular volume is larger is adsorbed mainly on Y-type zeolite.

The HC-adsorbent of the second aspect of the present invention is composed of a first zeolite of ZSM-5 and a second zeolite of mordenite. With this arrangement, HC of which the number of carbon is smaller and molecular volume is smaller is adsorbed mainly on ZSM-5 while HC of which the number of carbon is in the medium range and molecular volume is in the medium range is adsoroed mainly on mordenite.

The HC-adsorbent of the third aspect of the present invention is composed of a first zeolite of mordenite, and a second zeolite of Y-type zeolite. with this arrangement, HC of which the number of carbon is in the medium range and molecular volume is in the medium range is adsorbed mainly on mordenite while HC of which the number of carbon is larger and molecular volume is larger is adsorbed mainly on Y-type zeolite.

As described above, by combining ZSM-5, mordenite and Y-type zeolite with each other variously, various kinds of HC of which the molecular volume ranges from a larger volume to a smaller volume can be adsorbed effectively. In the preceding examples, two of ZSM-5, mordenite and Y-type zeolite are combined with each other. Alternatively, three of ZSM-5, mordenite and Y-type zeolite may be combined with each other.

In case the $SiO_2/Al_2O_3$ mole-ratio of ZSM-5 is less than 500, the $SiO_2/Al_2O_3$ mole-ratio of mordenite is less than 100 and the $SiO_2/Al_2O_3$ mole-ratio of Y-type zeolite is less than 200, the hydrophilic property of each zeolite increases to adsorb $H_2O$ molecules in exhaust gases, first, thus obstructing the adsorption of HC. Furthermore, under the conditions of elevated temperatures (800 °C. or more), separation of aluminium occurs so that the crystal structure tends to be broken to decrease the HC-adsorbing ability.

In case two of ZSM-5, mordenite and Y-type zeolite are combined with each other, the preferred weight ratio of the first zeolite having a smaller pore diameter to the second zeolite having a larger pore diameter ranges from 50/50to 85/15, as disclosed in the fourth aspect of the present invention. When the first zeolite is less than the above range. the HC-adsorption rate decreases. By increasing the amount of the first zeolite, as compared to the second zeolite the HC-adsorption rate is remarkably improved. When the first zeolite is greater than 85 weight % of the entire zeolite, adsorption of HC having a larger number of carbon and larger molecular volume becomes difficult, thereby decreasing the HC-adsorption rate.

The HC-adsorbent in accordance with the present invention can be used by mixing the first zeolite powder and second zeolite powder in the above-described composition ratios and coating the surface of a monolithic carrier or metal carrier with an obtained mixture. Alternatively, a coating layer of the first zeolite powder and a coating layer of the second zeolite powder may be superimposed on the surface of the monolithic carrier or metal carrier in this order or reverse order.

As shown in the fifth aspect of the present invention, it is preferable that the HC-adsorbent of the present invention carries at least one of Ag and Pd. With this arrangement, the adsorption rate of HC having a smaller number of carbon is further improved, whereby almost all kinds of HC in exhaust gases can be adsorbed. Namely, lower HC having the number of carbon of 3 or less, which is difficult to be adsorbed by zeolite, is chemically adsorbed by Ag and/or Pd,whereby the HC-adsorption rate is greatly improved.

The preferred amount of each of Ag and Pd carried ranges from 5 to 10 g per liter of HC-occuludable material. If less than the above range, the de sired effect due to Ag and Pd cannot be obtained. And if greater than the above range, the effect due to Ag and Pd is saturated, and manufacturing costs are increased. When both Ag and Pd are carried,the preferred total amount of Ag and Pd ranges from 5 to 10 g per liter of HC-occuludable material.

However, when two types of zeolite, which are selected from ZSM-5, mordenite and Y-type zeolite, are combined with each other, it is difficult to adsorb HC of which the number of carbon is 2 or less. Accordingly, as shown in the sixth aspect of the present invention, it is preferable to compose the HC-adsorbent of a first zeolite including ferrierite, and a second zeolite including at least one of ZSM-5 of which the $SiO_2/Al_2O_3$ mole-ratio is 500 or more, Y-type zeolite of which the $SiO_2/Al_2O_3$ mole-ratio is 200 or more. and mordenite of which the $SiO_2/Al_2O_3$ mole-ratio is 100 or more. The pore diameter of ferrierite is 4 Å, which is approximately equal to the molecular diameter of ethylene of which the number of carbon is two. With the addition of ferrierite, the adsorbing ability against ethylene is improved.

In the HC-adsorbent of the sixth aspect, the second zeolite may be composed of at least one of ZSM-5 of which the $SiO_2/Al_2O_3$ mole-ratio is 500 or more, Y-type zeolite of which the $SiO_2/Al_2O_3$ mole-ratio is 200 or more. and mordenite of which the $SiO_2/Al_2O_3$ mole-ratio is 100 or more. One of the above materials will do, or a mixture of two or three of them can be used. The preferred second zeolite is a mixture of ZSM-5 and Y-type zeolite having the weight ratio of from 0/100 to 75/25. With this arrangement, the HC-adsorbing ability is particularly improved.

The preferred mixture ratio of the first zeolite of ferrierite ranges from 10 to 80 weight % of the total amount of zeolite. When less than 10 weight %, the effect due to the addition of ferrierite is not obtained. When greater than 80 weight %, the adsorbing ability against HC of which the number of carbon is 3 or more decreases.

As shown in the seventh aspect of the present invention, it is preferable that ferrierite carries at least one of Ag and Pd.

The $SiO_2/Al_2O_3$ mole-ratio of ferrierite is not limited specifically, but the range from 10 to 200 is preferable. When the ratio is less than 10, the ion-exchanging site is large but the heat resistance is inferior. When the ratio is greater than 200, the heat resistance is good but carrying of Ag or Pd becomes difficult.

In the ZSM-5, mordenite and Y-type zeolite of which the $SiO_2/Al_2O_3$ mole-ratio is larger, the ion-exchanging site is insufficient so that Ag or Pd which has been carried thereby tends to move. Upon performing an endurance test at elevated temperatures, particle growth of Ag or Pd arises to decrease the HC-adsorbing ability. In contrast, with the arrangement of Ag or Pd being carried by ferrierite, Ag or Pd is highly dispersed in the pores having smaller diameters and carried therein stably so that the particle growth due to the endurance test at elevated temperatures is restrained,and consequently, the durability is further improved.

With the HC-adsorbent in accordance with the present invention, the HC-adsorption rate is improved, and since it exhibits a high heat-resistance, a high HC-adsorption rate can be ensured after endurance test. Furthermore, with the arrangement of carrying Ag or Pd, the HC-adsorption rate is further improved.

Other objects, features, and characteristics of the present invention will become apparent upon consideration of the following description and the appended claims with reference to the accompanying drawings, all of which from a part of this specification.

DETAILED DESCRIPTION OF THE PRESENTLY PREFERRED EXEMPLARY EMBODIMENTS

Figure 1:
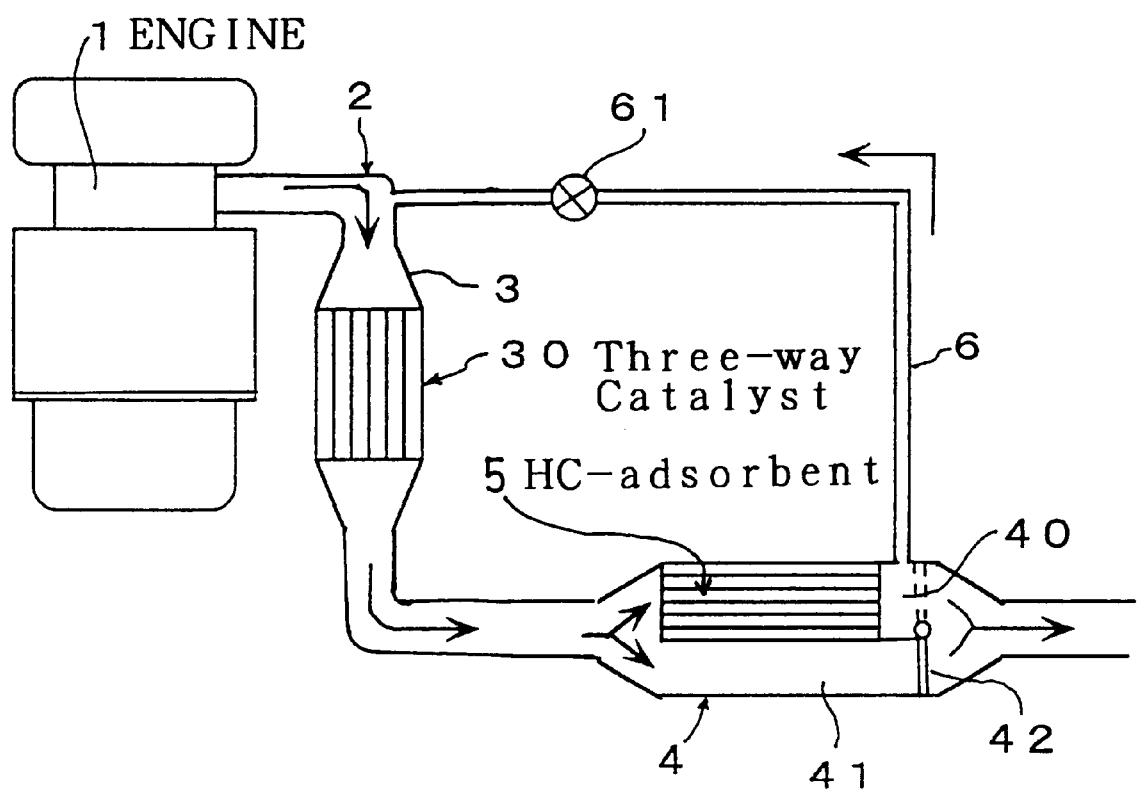
FIG. 1 is a schematic diagram illustrating a device for purifying exhaust gases, in which an HC-adsorbent in accordance with the present invention is disposed.

Hereinafter, the present invention will be explained in detail based on several embodiments and comparative examples.

FIG. 1 illustrates a device for purifying exhaust gases with an HC-adsorbent of the present invention. In this device, an engine 1 with a displacement of 2L has an exhaust pipe 2 in which a catalytic converter 3 provided with a three-way catalyst 30 is disposed, and an HC-adsorbing device 4 is disposed downstream of the catalytic converter 3.

The HC-adsorbing device 4 has two exhaust gas passages. HC-adsorbent 5 is disposed in an exhaust gas passage 40, and the other exhaust gas passage 41 acts as a by-pass passage. A change-over valve 42 adapted to switch the passages 40 and 41 is provided at the downstream side of the HC-adsorbing device 4. A pipe 6 is further provided downstream of the HC-adsorbent 5 so as to be communicated with the upstream side of the catalytic converter 3.

With this device, when the engine is started, or in the cold state, the change-over valve 42 is operated to close the passage 41. This results in exhaust gases being discharged by way of the passage 40, and HC which has not been purified by the three-way catalyst 30 being adsorbed on the HC-adsorbent 5.

When the temperature of the exhaust gases is elevated sufficiently, the change-over valve 42 is operated to close the passage 40. This results in exhaust gases being discharged by way of the passage 41 without passing the HC-adsorbent 5. HC which has been adsorbed on the HC-adsorbent 5 is desorbed therefrom. By opening a valve 61, desorbed HC is supplied to exhaust gases upstream of the three-way catalyst 30 by way of the pipe 6, and is purified with the three-way catalyst 30.

EMBODIMENT 1

360 g of ZSM-5 powder ( pore diameter: 5.5 Å, $SiO_2/Al_2O_3$ mole-ratio=1900), 40 g of Y-type zeolite powder (pore diameter: 8 Å, $SiO_2/Al_2O_3$ mole-ratio=400), 140 g of silica sol and 360 g of pure water were mixed together to prepare a slurry.

A monolithic carrier of cordierite (volume: 1L, the number of cells: 400 cells/in$^2$) was entirely coated with this slurry uniformly, dried at 250° C. for 1 hour, and fired at 500° C. for 1 hour to prepare an HC-adsorbent of Embodiment 1. The weight ratio of ZSM-5 to Y-type zeolite (ZSM-5/Y-type zeolite) in a resultant coating layer is 90/10, and the amount of the coating layer is about 200 g per liter of the monolithic carrier.

EMBODIMENT 2

An HC-adsorbent of the present embodiment was prepared, similarly to Embodiment 1, except that the weight ratio of ZSM-5 to Y-type zeolite (ZSM-5/Y-type zeolite) in a resultant coating layer was 85/15.

EMBODIMENT 3

An HC-adsorbent of the present embodiment was prepared, similarly to Embodiment 1, except that the weight ratio of ZSM-5 to Y-type zeolite (ZSM-5/Y-type zeolite) in a resultant coating layer was 75/25.

EMBODIMENT 4

An HC-adsorbent of the present embodiment was prepared, similarly to Embodiment 1, except that the weight ratio of ZSM-5 to Y-type zeolite (ZSM-5/Y-type zeolite) in a resultant coating layer was 50/50.

EMBODIMENT 5

An HC-adsorbent of the present embodiment was prepared, similarly to Embodiment 1, except that the weight ratio of ZSM-5 to Y-type zeolite (ZSM-5/Y-type zeolite) in a resultant coating layer was 25/75.

COMPARATIVE EXAMPLE 1

An HC-adsorbent of the present example was prepared, similarly to Embodiment 1, except that the weight ratio of ZSM-5 to Y-type zeolite (ZSM-5/Y-type zeolite) in a resultant coating layer was 0/100.

COMPARATIVE EXAMPLE 2

An HC-adsorbent of the present example was prepared, similarly to Embodiment 1, except that the weight ratio of ZSM-5 to Y-type zeolite (ZSM-5/Y-type zeolite) in a resultant coating layer was 0/100.

EMBODIMENT 6

300 g of ZSM-5 powder (pore diameter: 5.5 Å, $SiO_2/Al_2O_3$ mole-ratio=500), 100 g of Y-type zeolite powder (pore diameter: 8 Å, $SiO_2/Al_2O_3$ mole-ratio=200), 140 g of silica sol and 360 g of pure water were mixed together to prepare a slurry.

A coating layer was formed with this slurry, similarly to Embodiment 1, to prepare an HC-adsorbent of Embodiment 6. The weight ratio of ZSM-5 to Y-type zeolite in the resultant coating layer is 75/25, and about 200 g of coating layer is formed per liter of the monolithic carrier.

COMPARATIVE EXAMPLE 3

300 g of ZSM-5 powder (pore diameter: 5.5 Å, $SiO_2/Al_2O_3$ mole-ratio=100), 100 g of Y-type zeolite powder (pore diameter: 8 Å, $SiO_2/Al_2O_3$ mole-ratio=20), 140 g of silica sol and 360 g of pure water were mixed together to prepare a slurry.

A coating layer was formed with this slurry, similarly to Embodiment 1, to prepare an HC-adsorbent of Comparative example 3. The weight ratio of ZSM-5 to Y-type zeolite in a resultant coating layer is 75/25, and about 200 g of coating layer is formed per liter of the monolithic carrier.

EMBODIMENT 7

200 g of Y-type zeolite powder (pore diameter: 8 Å, $SiO_2/Al_2O_3$ mole-ratio=400), 70g of silica sol and 180g of pure water were mixed together to prepare a slurry.

An underlying coating layer was formed, using this slurry, similarly to Embodiment 1. The amount of the underlying coating layer is about 100 g per liter of the monolithic carrier.

Next, 200 g of ZSM-5 powder (pore diameter: 5.5 Å, $SiO_2/Al_2O_3$ mole-ratio=1900), 70 g of silica sol and 180 g of pure water were mixed together to prepare another slurry.

An upper coating layer was formed on the surface of the underlying coating layer, using the another slurry. The amount of the upper coating layer is about 100 g per liter of the monolithic carrier.

EMBODIMENT 8

An HC-adsorbent of the present embodiment was prepared, similarly to Embodiment 7, except that the underlying coating layer and upper coating layer were composed reversely to those of Embodiment 7 to first form an underlying coating layer of ZSM-5 on the monolithic carrier, and then, form an upper coating layer of Y-type zeolite on the underlying coating layer.

EMBODIMENT 9

The HC-adsorbent prepared in Embodiment 1 was immersed in an aqueous solution of pd ammine hydroxide, which has a predetermined concentration, for 1 hour, and then, dried at 250° C. for 1 hour so that a resultant coating layer carried about 10 g of Pd.

EMBODIMENT 10

The HC-adsorbent prepared in Embodiment 1 was immersed in an aqueous solution of pd ammine hydroxide, which has a predetermined concentration, for 1 hour, and then, dried at 250° C. for 1 hour so that a resultant coating layer carried about 5 g of Pd.

EMBODIMENT 11

The HC-adsorbent prepared in Embodiment 1 was immersed in an aqueous solution of pd ammine hydroxide, which has a predetermined concentration, for 1 hour, and then, dried at 250° C. for 1 hour so that a resultant coating layer carried about 1 g of Pd.

EMBODIMENT 12

The HC-adsorbent prepared in Embodiment 1 was immersed in an aqueous solution of silver nitrate, which has a predetermined concentration, for 1 hour, and then, dried at 250° C. for 1 hour so that a resultant coating layer carried about 10 g of Ag.

EMBODIMENT 13

The HC-adsorbent prepared in Embodiment 1 was immersed in an aqueous solution of silver nitrate, which has a predetermined concentration for 1 hour, and then, dried at 250° C. for 1 hour so that a resultant coating layer carried about 5 g of Ag.

EMBODIMENT 14

The HC-adsorbent prepared in Embodiment 1 was immersed in an aqueous solution of silver nitrate, which has a predetermined concentration, for 1 hour, and then, dried at 250° C. for 1 hour so that a resultant coating layer carried about 1 g of Ag.

EMBODIMENT 15

360 g of ZSM-5 powder ( pore diameter: 5.5 Å, $SiO_2/Al_2O_3$ mole-ratio=1900), 40g of mordenite powder (pore diameter: 7 Å, $SiO_2/Al_2O_3$ mole-ratio=200), 140 g of silica sol and 360 g of pure water were mixed together to prepare a slurry.

A coating layer was formed with this slurry, similarly to Embodiment 1, to prepare an HC-adsorbent of Embodiment 15. The weight ratio of ZSM-5 to mordenite (ZSM-5/mordenite) in the resultant coating layer is 90/10, and the amount of the coating layer is about 200 g per liter of the monolithic carrier.

EMBODIMENT 16

An HC-adsorbent of the present embodiment was prepared, similarly to Embodiment 15, except that the weight ratio of ZSM-5 to mordenite (ZSM-5/mordenite) in a resultant coating layer was 85/15.

EMBODIMENT 17

An HC-adsorbent of the present embodiment was prepared, similarly to Embodiment 15, except that the weight ratio of ZSM-5 to mordenite (ZSM-5/mordenite) in a resultant coating layer was 75/25.

EMBODIMENT 18

An HC-adsorbent of the present embodiment was prepared, similarly to Embodiment 15, except that the weight ratio of ZSM-5 to mordenite (ZSM-5/mordenite) in a resultant coating layer was 50/50.

EMBODIMENT 19

An HC-adsorbent of the present embodiment was prepared, similarly to Embodiment 15, except that the weight ratio of ZSM-5 to mordenite (ZSM-5/mordenite) in a resultant coating layer was 25/75.

EMBODIMENT 20

360 g of mordenite powder (pore diameter: 7 Å, $SiO_2/Al_2O_3$ mole-ratio=200), 40g of Y-type zeolite (pore diameter: 8 Å, $SiO_2/Al_2O_3$ mole-ratio=400), 140 g of silica sol and 360 g of pure water were mixed together to prepare a slurry.

A coating layer was formed with this slurry, similarly to Embodiment 1, to prepare an HC-adsorbent of Embodiment 20. The weight ratio of mordenite to Y-type zeolite (mordenite/Y-type zeolite) in the resultant coating layer is 90/10, and the amount of the coating layer is about 200 g per liter of the monolithic carrier.

EMBODIMENT 21

An HC-adsorbent of the present embodiment was prepared, similarly to Embodiment 20, except that the weight ratio of mordenite to Y-type zeolite (mordenite/Y-type zeolite) in a resultant coating layer was 85/15.

EMBODIMENT 22

An HC-adsorbent of the present embodiment was prepared, similarly to Embodiment 20, except that the weight ratio of mordenite to Y-type zeolite-e (mordenite/Y-type zeolite) in a resultant coating layer was 75/25.

EMBODIMENT 23

An HC-adsorbent of the present embodiment was prepared, similarly to Embodiment 20, except that the weight ratio of mordenite to Y-type zeolite (mordenite/Y-type zeolite) in a resultant coating layer was 50/50.

EMBODIMENT 24

An HC-adsorbent of the present embodiment was prepared, similarly to Embodiment 20, except that the weight ratio of mordenite to Y-type zeolite (mordenite/Y-type zeolite) in a resultant coating layer was 25/75.

COMPARATIVE EXAMPLE 4

400 g of mordenite powder (pore diameter: 7 Å, $SiO_2/Al_2O_3$ mole-ratio=200), 140 g of silica sol and 360 g of pure water were mixed together to prepare a slurry.

A coating layer was formed with this slurry, similarly to Embodiment 1, to prepare an HC-adsorbent of Comparative example 4. The amount of the coating layer is about 200 g per liter of the monolithic carrier.

COMPARATIVE EXAMPLE 5

300 g of mordenite powder (pore diameter: 7 Å, $SiO_2/Al_2O_3$ mole-ratio=30), 100 g of Y-type zeolite powder(pore diameter: 7 Å, $SiO_2/Al_2O_3$ mole-ratio=400), 140 g of silica sol and 360 g of pure water were mixed together to prepare a slurry.

A coating layer was formed with this slurry, similarly to Embodiment 1, to prepare an HC-adsorbent of Comparative example 5. The weight ratio of mordenite to Y-type zeolite (mordenite/Y-type zeolite) in the coating layer is 75/25, and the amount of the coating layer is about 200 g per liter of the monolithic carrier.

EXPERIMENT AND EVALUATION

The HC-adsorbents thus prepared were respectively secured to the exhaust system of an actual gasoline engine, and an endurance test was performed by operating the gasoline engine at an exhaust gas temperature of 800° C. for 100 hours. The HC-adsorbents after the endurance test were respectively disposed in the HC-adsorbing device 4 shown in FIG. 1, and the HC-adsorption rate of each HC-adsorbent was measured. The measurement results are shown in TABLES 1 and 2.

Within the catalytic converter 3, the three-way catalyst 30 having a volume of 1 L, which carries catalytic noble metals in the Pt/Rh ratio of 1.5/0.3 (g/L), is disposed. An engine 1 was started at 1000 to 1100 rpm while the passage 41 is closed with the change-over valve 42, and the HC concentrations upstream and downstream of the HC-adsorbent 5 are measured for 60 seconds to obtain HC-adsorption rates.

TABLE 1

|  |  | First zeolite | | Second zeolite | | Composition ratio |
|---|---|---|---|---|---|---|
|  |  | Type | $SiO_2/Al_2O_3$ | Type | $SiO_2/Al_2O_3$ |  |
| Embodiment | 1 | ZSM-5 | 1900 | Y-type | 400 | 90/10 |
|  | 2 | ZSM-5 | 1900 | Y-type | 400 | 85/15 |
|  | 3 | ZSM-5 | 1900 | Y-type | 400 | 75/25 |
|  | 4 | ZSM-5 | 1900 | Y-type | 400 | 50/50 |
|  | 5 | ZSM-5 | 1900 | Y-type | 400 | 25/75 |
| Comparative example | 1 | ZSM-5 | 1900 | — | — | 100/0 |
|  | 2 | — | — | Y-type | 400 | 0/100 |
| Embodiment | 6 | ZSM-5 | 500 | Y-type | 200 | 75/25 |
| Comparative example | 3 | ZSM-5 | 100 | Y-type | 20 | 75/25 |
|  |  | Upper layer zeolite | | Underlying layer zeolite | |  |
| Embodiment | 7 | ZSM-5 | 1900 | Y-type | 400 | 50/50 |
|  | 8 | Y-type | 400 | ZSM-5 | 1900 | 50/50 |
|  |  | First zeorite | | Second zeolite | |  |
| Embodiment | 9 | ZSM-5 | 1900 | Y-type | 400 | 75/25 |
|  | 10 | ZSM-5 | 1900 | Y-type | 400 | 75/25 |
|  | 11 | ZSM-5 | 1900 | Y-type | 400 | 75/25 |
|  | 12 | ZSM-5 | 1900 | Y-type | 400 | 75/25 |
|  | 13 | ZSM-5 | 1900 | Y-type | 400 | 75/25 |
|  | 14 | ZSM-5 | 1900 | Y-type | 400 | 75/25 |

|  |  | Carrying metal | | HC-adsoption rate |
|---|---|---|---|---|
|  |  | kind | Amount | (%) |
| Embodiment | 1 | — | — | 77 |
|  | 2 | — | — | 80 |
|  | 3 | — | — | 82 |
|  | 4 | — | — | 80 |
|  | 5 | — | — | 76 |
| Comparative example | 1 | — | — | 70 |
|  | 2 | — | — | 75 |
| Embodiment | 6 | — | — | 80 |
| Comparative example | 3 | — | — | 68 |
| Embodiment | 7 | — | — | 81 |
|  | 8 | — | — | 80 |
| Embodiment | 9 | Pd | 10 g | 86 |
|  | 10 | Pd | 5 g | 86 |
|  | 11 | Pd | 1 g | 83 |
|  | 12 | Ag | 10 g | 88 |
|  | 13 | Ag | 5 g | 87 |
|  | 14 | Ag | 1 g | 81 |

As is apparent from the comparison between Embodiments 1 through 5 and Comparative examples 1 and 2, HC-adsorption rate was improved by mixing ZSM-5 and Y-type zeolite together, as compared to the case only ZSM-5 or Y-type zeolite is used, and, the most preferred compostion ratio ( ZSM-5 /Y-type zeolite) ranges from 50/50 to 85/15. Namely, lower HC having a small number of carbon is difficult to be adsorbed, and accordingly, it is effective to use a larger amount of ZSM-5 exhibiting high adsorption properties there against, as compared to the Y-type zeolite.

Furthermore, as is apparent from the comparison between Embodiments 3 and 6 and Comparative example 3, the preferred $SiO_2/Al_2O_3$ mole-ratio of ZSM-5 is 500 or more, and the preferred $SiO_2/Al_2O_3$ mole-ratio of Y-type zeolite is 200 or more. It can be considered that as the $SiO_2/Al_2O_3$ mole-ratio increases, $H_2O$ becomes more difficult to be adsorbed, and consequently, the HC-adsorption rate also increases.

In addition, as is apparent from the comparison between Embodiment 4 and Embodiments 7 and 8, similarly high HC-adsorption rates can be obtained with the combination of ZSM-5 and Y-type zeolite in the form of superimposed coating layers as well as in the form of powered mixtures, and as is apparent from the comparison between Embodiment 7 and Embodiment 8, such high HC-adsorption rates of the superimposed coating layers of ZSM-5 and Y-type zeolite do not depend on the superimposing order of ZSM-5 layer and Y-type zeolite layer.

And as is apparent from the comparison between Embodiment 3 and Embodiments 9 through 14, the HC-adsorption rate is further improved with Pd or Ag carried by the zeolite coating layer, and it is preferable that a larger amount of Pd or Ag within the range from 1 to 10 g/L is carried thereby.

TABLE 2

|  |  | First zeolite | | Second zeolite | | Composition ratio |
|---|---|---|---|---|---|---|
|  |  | Type | $SiO_2/Al_2O_3$ | Type | $SiO_2/Al_2O_3$ |  |
| Embodiment | 15 | ZSM-5 | 1900 | mordenite | 200 | 90/10 |
|  | 16 | ZSM-5 | 1900 | mordenite | 200 | 85/15 |
|  | 17 | ZSM-5 | 1900 | mordenite | 200 | 75/25 |
|  | 18 | ZSM-5 | 1900 | mordenite | 200 | 50/50 |
|  | 19 | ZSM-5 | 1900 | mordenite | 200 | 25/75 |
|  | 20 | mordenite | 200 | Y-type | 400 | 90/10 |
|  | 21 | mordenite | 200 | Y-type | 400 | 85/15 |
|  | 22 | mordenite | 200 | Y-type | 400 | 75/25 |
|  | 23 | mordenite | 200 | Y-type | 400 | 50/50 |
|  | 24 | mordenite | 200 | Y-type | 400 | 25/75 |
| Comparative example | 4 | mordenite | 200 | — | — | 100/0 |
|  | 5 | mordenite | 30 | Y-type | 400 | 75/25 |

|  |  | Carrying metal | | HC-adsoption rate |
|---|---|---|---|---|
|  |  | kind | Amount | (%) |
| Embodiment | 15 | — | — | 74 |
|  | 16 | — | — | 78 |
|  | 17 | — | — | 81 |
|  | 18 | — | — | 79 |
|  | 19 | — | — | 73 |
|  | 20 | — | — | 75 |
|  | 21 | — | — | 78 |
|  | 22 | — | — | 80 |
|  | 23 | — | — | 81 |
|  | 24 | — | — | 74 |
| Comparative example | 4 | — | — | 72 |
|  | 5 | — | — | 70 |

TABLE 2 shows that where the first zeolite and second zeolite are composed of a combination of ZSM-5 and mordenite, or mordenite and Y-type zeolite, high HC-adsorption rates similar to those of the preceding embodiments can be obtained. The preferred composition ratio of the first zeolite to second zeolite (first zeolite/second zeolite) ranges from 50/50 to 85/15. TABLE 2 also shows that when the $SiO_2/Al_2O_3$ mole-ratio of mordenite is 30, the HC-absorption rate is low.

EMBODIMENT 25

200 g of ferrierite powder (pore diameter: 4 Å, $SiO_2/Al_2O_3$ mole-ratio=60), 80 g of ZSM-5 powder (pore diameter: 5.5 Å, $SiO_{2\ /Al_2O_3}$ mole-ratio=1900), 120 g of Y-type zeolite powder (pore diameter: 8 Å, $SiO_2/Al_2O_3$ mole-ratio=400), 140 g of silica sol and 360 g of pure water were mixed together to prepare a slurry.

A coating layer was formed with this slurry, similarly to Embodiment 1, to prepare an HC-adsorbent of Embodiment 25. The weight ratio (ferrierite/ZSM-5/Y-type zeolite) in the resultant coating layer is 50/20/30, and the amount of the coating layer is about 200 g per liter of the monolithic carrier.

EMBODIMENT 26

40 g of ferrierite powder (pore diameter: 4 Å, $SiO_2/Al_2O_3$ mole-ratio=60) was immersed in an aqueous solution of silver nitrate, which has a predetermined concentration, for 1 hour, and then, dried at 250° C. for 1 hour so that ferrierite carried 5g of Ag.

The entire amount of thus prepared ferrierite powder carrying Ag, 240 g of ZSM-5 powder (pore diameter: 5.5 Å, $SiO_2/Al_2O_3$ mole-ratio=1900), 120g of Y-type zeolite powder (pore diameter: 8 Å, $SiO_2/Al_2O_3$ mole-ratio=400), 140 g of silica sol and 360 g of pure water were mixed together to prepare a slurry.

A coating layer was formed with this slurry, similarly to Embodiment 1, to prepare an HC-adsorbent of Embodiment 26. The weight ratio (ferrierite/ZSM-5/Y-type zeolite) in the resultant coating layer is 10/60/30, and the amount of the coating layer is about 200 g per liter of the monolithic carrier.

EMBODIMENT 27

200 g of ferrierite powder (pore diameter: 4 Å, $SiO_2/Al_2O_3$ mole-ratio=60) was immersed in an aqueous solution of silver nitrate, which has a predetermined concentration, for 1 hour, and then, dried at 250° C. for 1 hour so that ferrierite carried 5g of Ag.

The entire amount of thus prepared ferrierite powder carrying Ag, 80 g of ZSM-5 powder (pore diameter: 5.5 Å, $SiO_{2\ /Al_2}O_3$ mole-ratio=1900), 120g of Y-type zeolite powder (pore diameter: 8 Å, $SiO_2/Al_2O_3$ mole-ratio=400), 140 g of silica sol and 360 g of pure water were mixed together to prepare a slurry.

A coating layer was formed with this slurry, similarly to Embodiment 1, to prepare an HC-adsorbent of Embodiment 27. The weight ratio (ferrierite/ZSM-5/Y-type zeolite) in the resultant coating layer is 50/20/30, and the amount of the coating layer is about 200 g per liter of the monolithic carrier.

EMBODIMENT 28

320 g of ferrierite powder (pore diameter: 4 Å, $SiO_2/Al_2O_3$ mole-ratio=60) was immersed in an aqueous solution of silver nitrate, which has a predetermined concentration, for 1 hour, and then, dried at 250° C. for 1 hour so that ferrierite carried 5 g of Ag.

The entire amount of thus prepared ferrierite powder carrying Ag, 80 g of Y-type zeolite powder (pore diameter: 8 Å, $SiO_{2\ Al_2}O_3$ mole-ratio=400), 140 g of silica sol and 360 g of pure water were mixed together to prepare a slurry.

A coating layer was formed with this slurry, similarly to Embodiment 1, to prepare an HC-adsorbent of Embodiment 28. The weight ratio (ferrierite/Y-type zeolite) in there sultant coating layer is 80/20, and the amount of the coating layer is about 200 g per liter of the monolithic carrier.

EMBODIMENT 29

360 g of ferrierite powder (pore diameter: 4 Å, $SiO_2/Al_2O_3$ mole-ratio=60) was immersed in an aqueous solution of silver nitrate, which has a predetermined concentration, for 1 hour, and then, dried at 250° C. for 1 hour so that ferrierite carried 5 g of Ag.

The entire amount of thus prepared ferrierite powder carrying Ag, 40 g of Y-type zeolite powder (pore diameter: 8 Å, $SiO_2/Al_2O_3$ mole-ratio=400), 140 g of silica sol and 360 g of pure water were mixed together to prepare a slurry.

A coating layer was formed with this slurry, similarly to Embodiment 1, to prepare an HC-adsorbent of Embodiment 29. The weight ratio (ferrierite/Y-type zeolite) in there sultant coating layer is 90/10, and the amount of the coating layer is about 200 g per liter of the monolithic carrier.

EXPERIMENT AND EVALUATION

The HC-adsorbents of Embodiments 25 through 29 were subjected to the endurance test similar to the cases of Embodiments 1 through 24. The HC-adsorption rates after the endurance test were measured, similarly. The measurement results are shown in TABLE 3. In TABLE 3, the measurement result of Embodiment 12 is also shown.

TABLE 3

| | | Composition ratio | | | Entire Ag-carrying amount | HC-adsorption rate (%) |
|---|---|---|---|---|---|---|
| | | First zeolite | | Second zeolite | | |
| | | Ferrierite | Ag-carrying amount | ZSM-5 | Y-type zeolite | | |
| Embodiment | 25 | 50 | — | 20 | 30 | 0 g | 83 |
| | 26 | 10 | 5 g | 60 | 30 | 5 g | 90 |
| | 27 | 50 | 5 g | 20 | 30 | 5 g | 92 |
| | 28 | 80 | 5 g | — | 20 | 5 g | 91 |
| | 29 | 90 | 5 g | — | 10 | 5 g | 79 |
| | 12 | — | — | 75 | 25 | 10 g | 88 |

As is apparent from TABLE 3, the HC-adsorbent of Embodiment 25 exhibits a high HC-adsorption rate (aster endurance test), as compared to Embodiments 1 through 8 and Embodiments 15 through 24, which shows that the HC-adsorption rate is further improved by adding ferrierite to the mixture of ZSM-5 and Y-type zeolite.

Furthermore, with the arrangement where ferrierite further carries Ag, a high HC-adsorption rate of 90% or more is obtained, which shows that the HC-adsorbing ability of this arrangement is higher than that of Embodiment 12 which carries 10 g of Ag. This table also shows that where the composition ratio of ferrierite ranges from 10 to 80 weight of the entire mixture, an especially high HC-adsorbing ability can be obtained.

While the invention has been described in connection with what are considered presently to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A hydrocarbon-adsorbent comprising:
   a first zeolite composed of ZSM-5 having a silica/alumina ($SiO_2/Al_2O_3$) mole-ratio of 500 or more; and
   a second zeolite composed of Y-type zeolite having a silica/alumina ($SiO_2/Al_2O_3$) mole-ratio of 200 or more, wherein the weight ratio of said first zeolite to said second zeolite (first zeolite/second zeolite) ranges from 75/25 to 90/10.

2. A hydrocarbon-adsorbent as claimed in claim 1, wherein at least one of said first zeolite and said second zeolite carries at least one of silver (Ag) and palladium (Pd).

3. A hydrocarbon-adsorbent as claimed in claim 2, wherein at least one of said first zeolite and said second zeolite carries at least one of 0.23 to 0.48 mmol/g of Ag and 0.23 to 0.48 mmol/g of Pd.

4. A hydrocarbon-adsorbent as claimed in claim 1, wherein the weight ratio of said first zeolite to said second zeolite (first zeolite/second zeolite) is about 75/25.

5. A hydrocarbon-adsorbent as claimed in claim 1, wherein at least one of said first zeolite and said second zeolite carries at least one of silver (Ag) and palladium (Pd).

6. A hydrocarbon-adsorbent as claimed in claim 5, wherein at least one of said first zeolite and said second zeolite carries at least one of 0.23 to 0.48 mmol/g of Ag and 0.23 to 0.48 mmol/g of Pd.

7. A hydrocarbon-adsorbent comprising:
   a first zeolite composed of ZSM-5 having a silica/alumina ($SiO_2/Al_2O_3$) mole-ratio of 500 or more; and
   a second zeolite composed of mordenite having a silica/alumina ($SiO_2/Al_2O_3$) mole-ratio of 100 or more.

8. A hydrocarbon-adsorbent as claimed in claim 7, wherein the weight ratio of said first zeolite to said second zeolite (first zeolite/second zeolite) is about 90/10.

9. A hydrocarbon-adsorbent as claimed in claim 7, wherein the weight ratio of said first zeolite to said second zeolite (first zeolite/second zeolite) ranges from 50/50 to 85/15.

10. A hydrocarbon-adsorbent as claimed in claim 7, wherein at least one of said first zeolite and said second zeolite carries at least one of silver (Ag) and palladium (Pd).

11. A hydrocarbon-adsorbent comprising:
    a first zeolite composed of mordenite having a silica/alumina ($SiO_2/Al_2O_3$, mole-ratio of 100 or more; and
    a second zeolite composed of Y-type zeolite having a silica/alumina ($SiO_2/Al_2O_3$) mole-ratio of 200 or more.

12. A hydrocarbon-adsorbent as claimed in claim 11, wherein the weight ratio of said first zeolite to said second zeolite (first zeolite/second zeolite) is about 90/10.

13. A hydrocarbon-adsorbent as claimed in claim 11, wherein the weight ratio of said first zeolite to said second zeolite (first zeolite/second zeolite) ranges from 50/50 to 85/15.

14. A hydrocarbon-adsorbent as claimed in claim 11, wherein at least one of said first zeolite and said second zeolite carries at least one of silver (Ag) and palladium (Pd).

15. A hydrocarbon-adsorbent comprising:
    a first zeolite composed of ferrierite; and
    a second zeolite composed of at least one of ZSM-5 having a silica/alumina ($SiO_2/Al_2O_3$) mole-ratio of 500 or more, Y-type zeolite having a silica/alumina ($SiO_2/Al_2O_3$) mole-ratio of 200 or more and mordenite having a silica/alumina ($SiO_2/Al_2O_3$) mole-ratio of 100 or more.

16. A hydrocarbon-adsorbent as claimed in claim 15, wherein said ferrierite carries at least one of silver (Ag) and palladium (Pd).

17. A hydrocarbon-adsorbent as claimed in claim 15, wherein a silica/alumina ($SiO_2/Al_2O_3$) mole-ratio of said ferrierite ranges from 10 to 200.

* * * * *